Patented June 9, 1925.

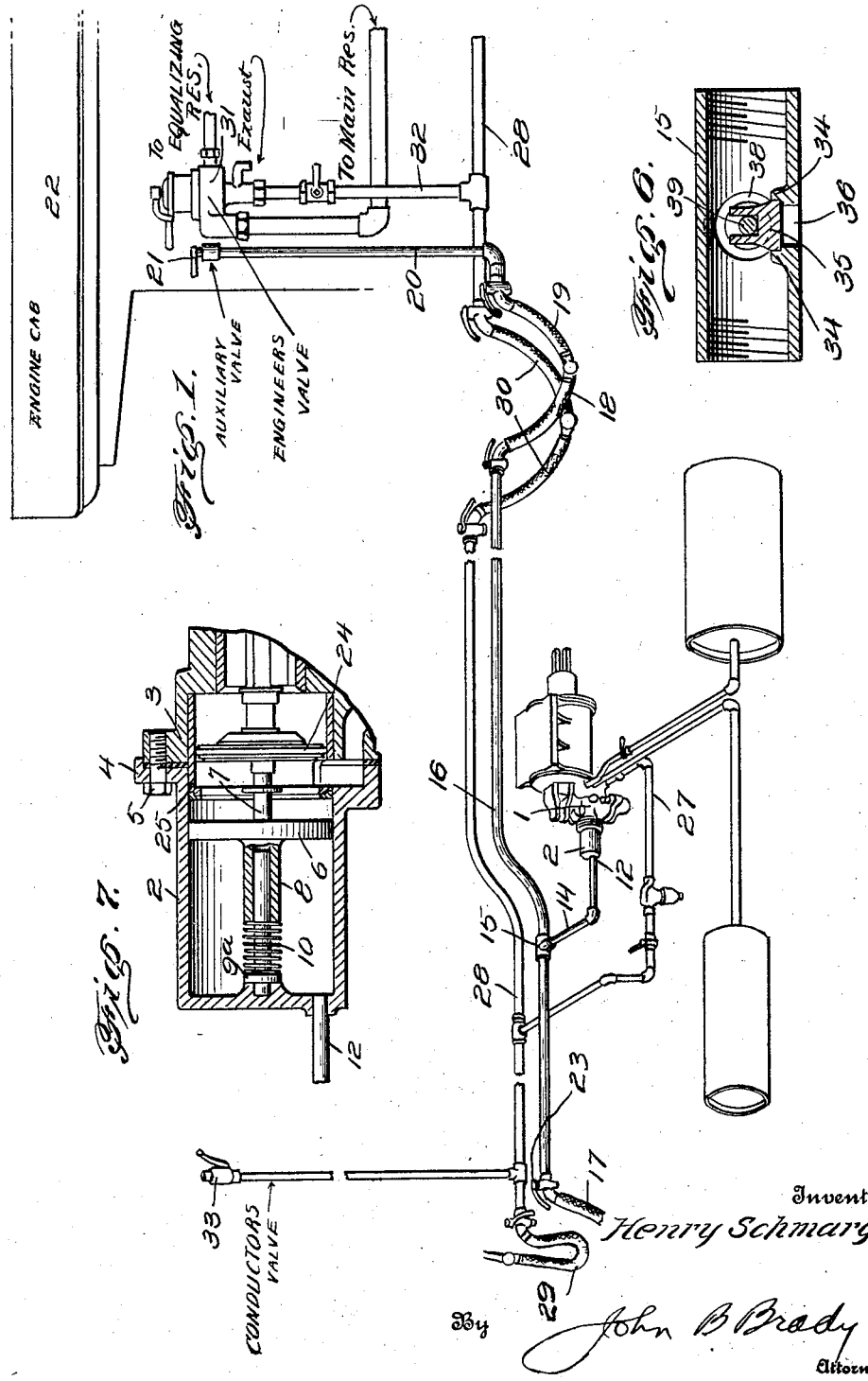

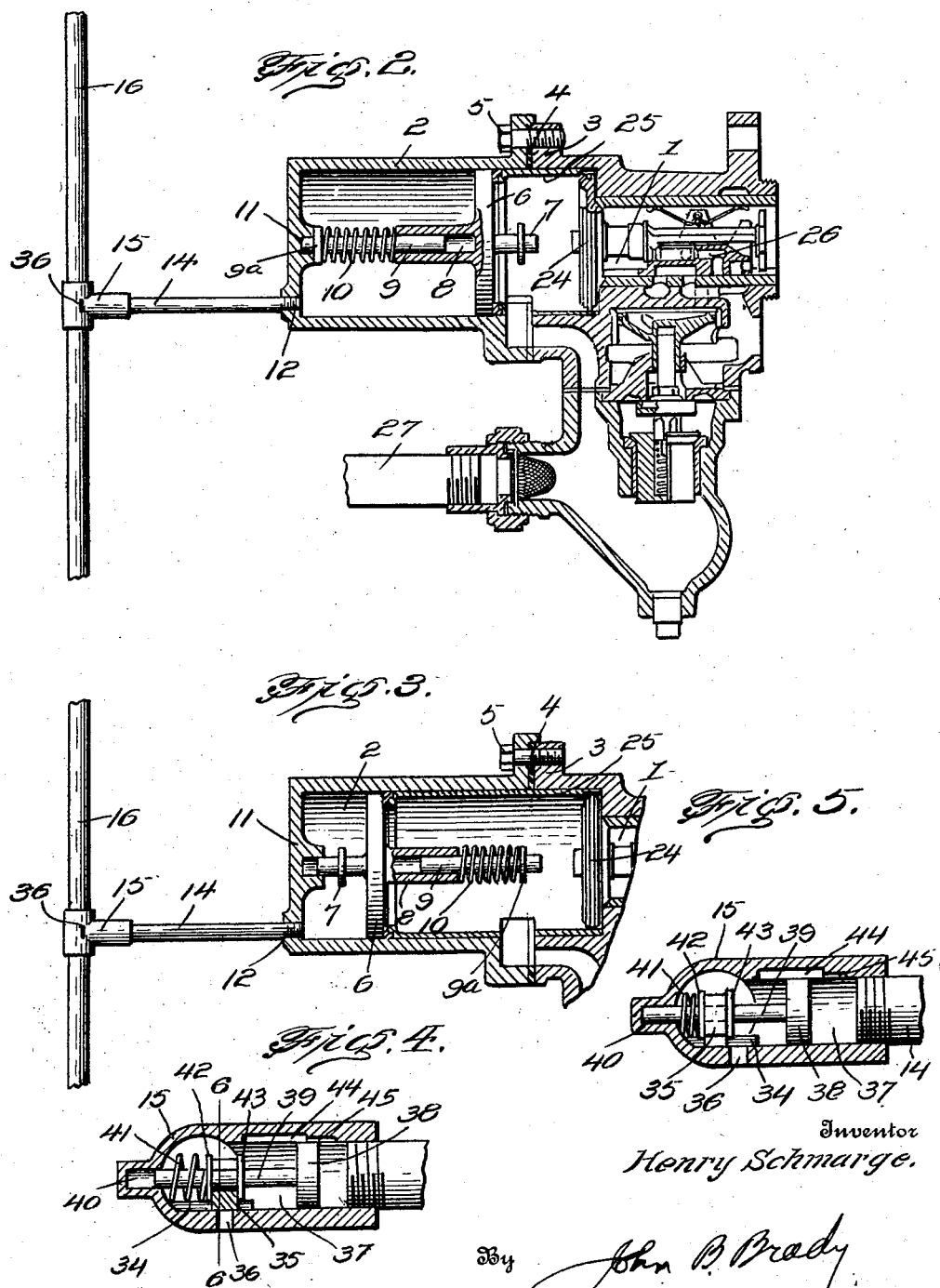

1,541,663

UNITED STATES PATENT OFFICE.

HENRY SCHMARGE, OF BELEN, NEW MEXICO.

AIR-BRAKE SYSTEM.

Application filed January 15, 1925. Serial No. 2,622.

*To all whom it may concern:*

Be it known that I, HENRY SCHMARGE, a citizen of the United States, residing at Belen, in the county of Valencia and State of New Mexico, have invented a certain new and useful Improvement in an Air-Brake System, of which the following is a specification.

My invention relates broadly to a protective system for use in traction and more particularly to a construction of air brake system wherein undesired quick action may be positively prevented.

One of the objects of my invention is to provide a construction of air brake system which is prevented from functioning in emergency position at undesired periods, thereby eliminating the damage to equipment and loading inherent with emergency action of an air brake at a time when such action is not desired.

Another object of my invention is to provide a positive means for preventing the operating piston of the triple valve from moving to emergency position when the air brake system is functioning in some other position and emergency action is not desired.

Still another object of my invention is to provide an attachment for a triple valve in an air brake system by which air under compression may be introduced on both sides of the piston in the triple valve and preventing the valve from moving to emergency position except when the pressure is reduced on one side of the triple valve piston.

A further object of my invention is to provide an air brake system having an auxiliary or emergency train pipe which parallels the brake pipe connecting the several cars of a train, with a control connected with the emergency train pipe arranged to be operated when the brakes are to be thrown in emergency position to secure quick action of the triple valve while preventing such action for all other positions of the triple valve.

A still further object of my invention is to provide a construction of T valve by which the pressure on one side of the piston in the air brake system may be regulated from an auxiliary emergency train pipe in such manner that air under pressure will normally prevent quick action of the triple valve while reduction in pressure in the emergency train pipe and movement of the T valve will operate to cause quick action of the triple valve.

My invention eliminates the destructive quick action heretofore inherent in triple valves at undesired intervals. This undesired emergency action at times when the brakes should function in service or other positions often causes destruction to equipment and loading. The undesired emergency action may cause draft rigging to be pulled out which in turn causes derailment and wrecking of cars and loading and in other cases it is the cause of cars buckling up and being crushed. There are instances where there may be no visible damage to the equipment and yet the sudden quick action and resultant shock will dislocate and damage the loading on the inside of the cars. The sudden shocks and stresses are undesirable to the engineer and the railroad personnel offering serious physical discomfort. Heretofore it has been attempted to prevent undesired quick action by providing a graduated spring against which the piston of the triple valve may move in one direction. The breaking of this spring is often the cause of undesired quick action or if the triple valve is dry and gummy or the brake pipe pressure is reduced at too rapid a rate through leakage or otherwise, quick action usually results.

By my invention I eliminate the graduated spring and graduating stem which I have found to be ineffective under conditions where accurate operation of the brakes is essential. In lieu of the graduated spring and stem I provide at one side of the triple valve, adjacent the operating piston and cylinder thereof, an auxiliary cylinder having a reciprocatory spring-pressed piston therein with a protruding head arranged to obstruct the movement of the triple valve piston into emergency position when such action is not desired. An independent emergency train pipe is provided which parallels the normal brake pipe with a connection between the independent train pipe and the auxiliary cylinder whereby air under pressure is admitted upon one side of the triple valve piston forming such an obstruction that the triple valve piston cannot move to emergency position until such a time as an emergency application of the brake is desired when the air in back of the piston is released causing the piston to move back and permitting the triple valve to travel to quick action or emergency position. In order to control the pressure in the auxiliary cylinder adjacent the triple valve I provide a valve in the engine cab, adjacent the normal engineer's valve, and any number of other valves in the auxiliary train pipe, by which the pressure in the auxiliary train pipe may be reduced simultaneously with the movement of the engineer's valve to emergency position enabling quick action of the triple valve. The pressure in the auxiliary train pipe may be suddenly reduced by the parting of cars and rupture of the coupling whereupon the pressure in the auxiliary cylinder is suddenly reduced and the triple valve moved to emergency position. In order to facilitate operation of the system I provide a T valve connection between the auxiliary pipe line and the connection to the auxiliary cylinder as will be hereinafter described in more detail.

My invention will be more clearly understood from the following specification by reference to the accompanying drawings, in which:

Figure 1 is a diagrammatic view showing the arrangement of the brake pipe and the auxiliary emergency pipe line, the auxiliary cylinder and the triple valve in the air brake system of my invention; Fig. 2 shows one construction of the triple valve and the attachment of my invention; Fig. 3 shows a modified construction of my attachment for the triple valve; Fig. 4 is a cross sectional view taken through the T valve employed between the auxiliary train pipe and the connection to the auxiliary cylinder; Fig. 5 is a cross sectional view of the T valve in position where the pressure in the auxiliary train pipe has been reduced and the obstruction removed from the piston of the triple valve enabling the valve to move to quick action or emergency position; Fig. 6 is a cross sectional view taken on line 6—6 of the T valve illustrated in Fig. 4; and Fig. 7 illustrates the piston of the triple valve moved into emergency position against the obstruction offered by the reciprocatory piston in the auxiliary cylinder.

Referring to the drawings in detail, the triple valve is represented in general by reference character 1 having a flange 3 against which the auxiliary cylinder 2 abuts and is secured in position against the gasket 4 by means of bolts 5. The auxiliary cylinder 2 contains a reciprocatory piston 6 having a central protruding stem and shoulder 7 at one side and an extended socket 8 at the other side thereof. A central stem 9 having a shoulder 9ª abutting the bushing 11 formed in the end wall of the auxiliary cylinder 2 has a spring 10 disposed thereon and operating against the extremity of the socket 8. The auxiliary cylinder 2 is charged with air of auxiliary brake pipe pressure equal to the pressure used in the triple valve after it has been reduced through the slide valve feed valve. This air is introduced into the auxiliary cylinder 2 at point 12 through the pipe line 14 which connects by means of the T valve 15 with the emergency train pipe 16. The emergency train pipe 16 may extend from car to car through the flexible couplings 17 and 18, the coupling 19 connecting through riser 20 with an auxiliary valve 21 in the engine cab 22. By opening the valve 21 the pressure in the auxiliary train pipe 16 may be reduced. Cutout valves as represented at 23 may be disposed in the auxiliary train pipe 16 at desired intervals along the train to permit operation of the brake system by remote control. The triple valve contains operating piston 24 arranged to reciprocate in cylinder 25 to move the slide valve 26 to the positions which control the admission of air to parts of the brake system for carrying out the functions of the brake. The connection to the brake pipe is indicated at 27 joining the brake pipe 28 extending parallel through the car, and being provided with the usual couplings 29 and 30 from car to car. The engineer's valve 31 is represented as connecting to the brake pipe through riser 32 for controlling the operation of the triple valve. The brake pipe may be provided with the usual conductor's valve 33 along the length of the train.

The T valve 15 includes a valve seat 34 having a reciprocatory valve member 35 which normally closes port 36 open to the atmosphere as represented in Figure 4. The T valve contains a cylindrical portion 37 in which piston 38 is arranged for reciprocatory movement. A stem 39 is provided for guiding the piston 38. The extremity of the stem 39 fits into socket opening 40 and the piston 38 is arranged to reciprocate against the action of spring 41. Lugs 42 and 43 are provided on the stem 39 for guiding the slide valve 35. The cylinder 37 is provided in one side with a groove 44 narrowing into a smaller groove 45 in such arrangement that the air from the branch pipe 16 may feed past the piston 45 into the branch pipe 14 and the emergency cylinder 2 during the process of charging the equipment with air. The arrangement of the grooves is such that the piston 38 can move toward the left moving the valve 35 to the left and opening the port 36 before much air is released from the emergency cylinder 2. This is important so that the air is released first from the emergency train pipe 16 and as quick as possible. In order to accomplish this quick release the port 36 is of an elongated shape as indicated in Figures 2 and 3. The groove 44 permits the release of air from the branch pipe 14 and auxiliary cylinder 2 past the piston 38 after the piston 38 has moved to the left and first opened the port 36 at least half way, My invention is adaptable to air brake systems which are at present in use by removing the graduating spring and graduating stem and substituting the arrangement illustrated in Figure 3 wherein the auxiliary cylinder 2 includes the reciprocatory piston 6 in reversed position to that illustrated in Figure 2. That is to say the protruding stem and shoulder 7 abuts the bushing 11, the bushing 11 serving as a guide for the stem 7 over the short displacement period. The socket 8 serves as a guide for the stem 9 having shoulder 9ᵃ at its extremity upon which the spring 10 is secured and against which the spring abuts. The extremity of the stem 9 is moved to obstruct the advancement of the triple valve piston 24 by increase in pressure in the auxiliary cylinder 2 whereas the stem 9 is retracted when the piston 6 is returned to its extreme left position. It will be observed that the application of my invention may be made without change in present equipment already installed on the rolling stock.

Quick action of the triple valve has been eliminated by my system by a positive obstruction avoiding the dependence of the action upon the compression of a spring as heretofore required in the art. Heretofore slight defective working of the triple valve or the triple piston might cause the system to jump into emergency position while the brake is being applied in a service application. By the system herein the engineer may make a service application of the brakes without fear of the triple valve jumping into emergency position for the valve is positively prevented from moving to quick action position until the auxiliary valve is actuated to release air from the rear of piston 6. When a service application of the brakes is made, the air to the right of the piston 6 will be reduced through standard equipment but in the cylinder 2 the pressure will remain equal to the pressure in the pipe line 16 thereby holding piston 6 firmly in a position to form an obstruction for the triple piston 24. Should the triple valve tend to jump forward it is prevented from going into undesired emergency position by being stopped by the stem 7 in Fig. 2 or the stem 9 in Fig. 3. However, when an emergency application of the brakes is made the valve 21 is actuated simultaneously with the operation of the engineer's valve 31 and the air in cylinder 2 to the left of piston 6 is released enabling the triple valve to move to emergency position as represented more clearly in Fig. 7.

It will be understood that the auxiliary valve may be combined with the engineer's valve in such manner that operation of the engineer's valve will simultaneously control the pressure in the auxiliary cylinder 2. It will also be understood that other modifications of the invention may be made and that I intend no limitations upon the invention other than those imposed by the scope of the appended claims.

What I claim and desire to secure by Letters Patent of the United States is as follows:

1. An air brake system comprising in combination a pair of pipe lines, a triple valve including a cylinder with an operating piston therein, a separate cylinder connected with said first mentioned cylinder and including a reciprocatory piston having an axial extension arranged to contact with a similar axial extension on said first mentioned piston and independent connections between said pipe lines and said cylinders whereby the stroke of said first mentioned piston may be positively shortened by increasing the pressure in said separate cylinder to protrude the axial extension on said reciprocatory piston in the path of said first mentioned piston for preventing undesired quick action of said triple valve.

2. An air brake system comprising in combination a brake pipe, a triple valve supplied with air under pressure from said brake pipe, a cylinder in said triple valve, an operating piston arranged for reciprocatory movement therein, an auxiliary cylinder adapted to be connected with said first mentioned cylinder, an auxiliary pipe line and a connection between said auxiliary pipe line and said auxiliary cylinder for introducing air under pressure in said auxiliary cylinder for controlling the movement of the piston in said first mentioned cylinder for preventing undesired quick action of said triple valve.

3. An air brake system comprising in combination a pair of pipe lines, a triple valve including a cylinder and an operating piston therein, a separate cylinder arranged to be connected with said aforementioned cylinder, a reciprocatory piston in said separate cylinder and connections between said triple valve and one of said pipe lines and between said separate cylinder and the other of said pipe lines for introducing air under pressure therein for controlling the movement of said reciprocatory piston and preventing undesired quick action thereof.

4. An air brake system comprising in combination a pair of pipe lines, a triple valve including a cylinder and a reciprocatory piston supplied with pressure from one of said pipe lines, a separate cylinder connected with said aforementioned cylinder and supplied with pressure from the other of said pipe lines, a reciprocatory piston in said separate cylinder and means carried by said reciprocatory piston in said separate cylinder arranged to form an obstruction in the path of movement of said first mentioned piston upon increase in pressure in said separate cylinder against the piston therein for preventing undesired quick action of said triple valve.

5. An air brake system comprising in combination a pair of pipe lines, a triple valve including a cylinder and a reciprocatory piston supplied with pressure from one of said pipe lines, a separate cylinder connected with said aforementioned cylinder and supplied with pressure from the other of said pipe lines, a reciprocatory piston in said separate cylinder, means in each of said pipe lines for independently controlling the pressure supplied to said cylinders from said pipe lines, and means carried by the reciprocatory piston in said separate cylinder for forming an obstruction in the path of movement of said first mentioned piston upon increase in pressure in said separate cylinder against the piston therein for preventing undesired quick action of said triple valve and permitting quick action upon operation of one of said independent control members and the release of air pressure in said separate cylinder.

6. An air brake system comprising in combination a triple valve including a cylinder and a reciprocatory piston therein, a second cylinder connected with said aforementioned cylinder and including an independent reciprocatory piston, a pair of pipe lines for supplying air under pressure to each of said cylinders, independent means for controlling the air pressure in each of said pipe lines, a valve interposed in the connection between one of said pipe lines and said second cylinder whereby upon operation of the control means in said pipe line, the pressure in the pipe line will be reduced prior to the reduction in pressure in said second cylinder.

7. An air brake system comprising in combination a triple valve including a cylinder and a reciprocatory piston therein, a second cylinder connected with said aforementioned cylinder and including a reciprocatory piston, a pair of pipe lines for supplying air under pressure to each of said cylinders, independent means for controlling the air pressure in each of said pipe lines, a T valve interposed in the connection between one of said pipe lines and said second cylinder, said T valve including a slide valve and a controlling piston connected therewith, said slide valve normally closing a port to atmosphere in a position wherein said last mentioned piston is positioned adjacent an air feeding groove whereby said second cylinder may be charged with air from said pipe line and the pressure released therein subsequent to the release in pressure in said pipe line.

HENRY SCHMARGE.